UNITED STATES PATENT OFFICE.

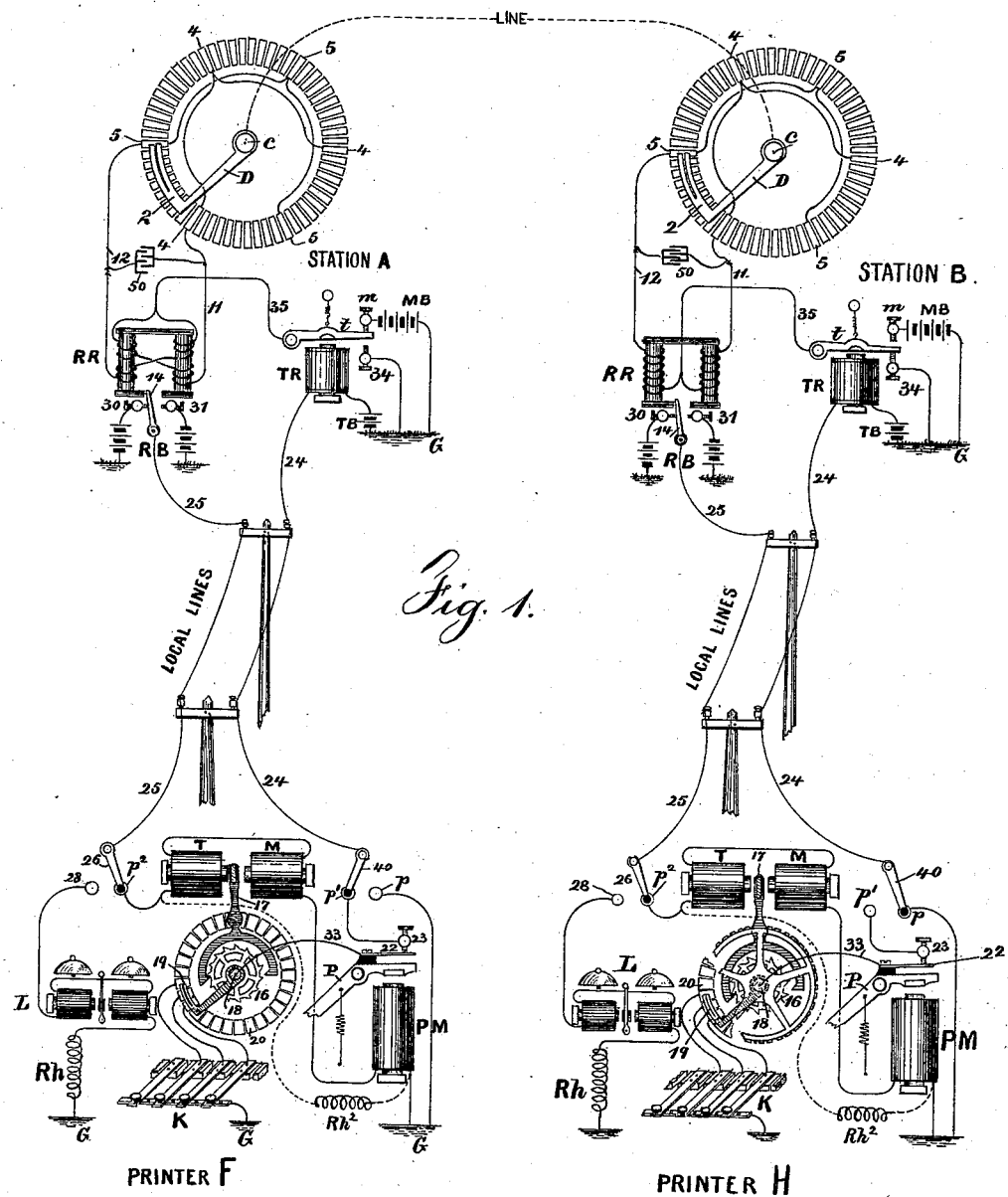

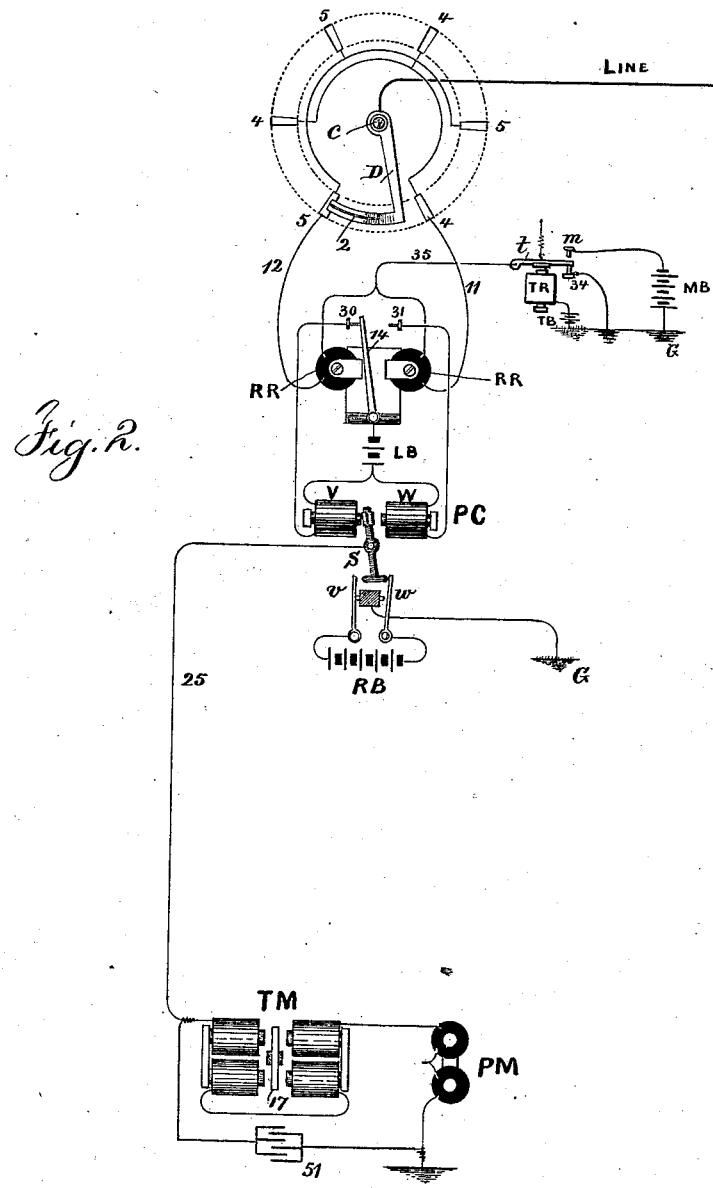

ROBERT G. BROWN, OF BROOKLYN, ASSIGNOR TO THE STANDARD MULTIPLEX TELEGRAPH COMPANY, OF NEW YORK, N. Y.

SYNCHRONOUS TELEGRAPHY.

SPECIFICATION forming part of Letters Patent No. 364,893, dated June 14, 1887.

Application filed January 26, 1887. Serial No. 225,519. (No model.)

*To all whom it may concern:*

Be it known that I, ROBERT G. BROWN, of Brooklyn, in the county of Kings and State of New York, have invented an Improvement in Synchronous Telegraphy, of which the following is a specification.

In this improvement I make use of revolving arms, rotated with uniformity of speed, and each provided with a trailer that is drawn over a circle of segments, so that the trailers are simultaneously upon corresponding segments in two synchronously-moving instruments at the distant ends of the main line and the segments are grouped together and connected in exterior local circuits to operate printing telegraph-instruments in such circuits.

Trailers and circles of segments grouped together are represented in Letters Patent No. 316,126, and the devices for rotating the trailers synchronously are represented in Letters Patent No. 286,281.

I combine with the synchronously-moving trailers, preferably, differentially-wound magnets, through which the current over the main line is passed in alternating directions to vibrate the armatures, and which pulsate a current upon a local line containing a printing-instrument, and I make use of a transmitting-relay, through the armature of which the main battery is placed on the main line and the type-wheels of the printing-instruments at the two ends of the main line are rotated synchronously, and the main battery is momentarily taken off the main line when the printing is to be effected, so that the type-wheels remain stationary; and the main battery is restored to the line by the movement of the printing-lever when it is actuated to print a letter or character. At the receiving printing telegraph-instrument the main battery is thrown out of circuit by a transmitting-relay, whose circuit is closed by a switch, so that the two printing telegraph-instruments are entirely controlled by the transmitter at the sending-station; but at the receiving-instrument the operator can indicate to the sender that the message has to be repeated.

In the drawings, Figure 1 is a diagrammatic view illustrating the instruments and circuits at the two ends of the main line, and Fig. 2 is a diagrammatic view of a modification in the reversing-relay.

The line is represented as extending from the shaft C of the synchronous instrument A to the shaft of the similar instrument, B, at the distant station. Upon these shafts C are the arms D, with the trailers 2, that travel over the circles of segments. I have shown sixty of these segments in each instrument; and six of these segments, preferably at equal distances apart are made use of for working the printing telegraph-instruments shown in the drawings, so that the synchronous instruments shown are adapted to ten printing-instruments and their circuit-connections. By this improvement a number of subscribers at distant stations can communicate with each other without interference with the other subscribers using the same line at the same time.

The reversing-relay R R is connected by the wires 11 and 12 with the segments 4 and 5, respectively, the three segments 5 being connected to the wire 12 and the three segments 4 with the wire 11, and these segments are intermediate and preferably equidistant. The wires 11 and 12, after passing through the reversing-relay R R, are connected together, and, by the wire 35, to the armature $t$ of the transmitter-relay T R. The main battery M B is connected one pole to the ground and the other pole to the top stop, $m$, of the transmitter, whose lower stop, 34, is to ground. The relay R R is preferably what is known as a "polarized" relay, and its helices are preferably wound differentially or wound in reverse directions, as indicated at station A, but may be wound and connected as illustrated at station B, so that when the current from the main battery M B passes through $m$, $t$, 35, and 11, the polarity of R R will be the reverse of the polarity when the current from M B passes through $m$, $t$, 35, and 12; hence as the trailers on the arms D of the synchronous instruments A and B come in contact with one of their segments 5, the armatures 14 will be brought in contact with their stops 30, and when the trailers reach their segments 4 the direction of current through relay R R and the polarity of same is reversed and the armatures 14 swing simultaneously into contact with 31. I here remark that at the distant instrument B, which is represented as connected with the receiving-printer H, the magnet of the transmitter T R is energized by a current from T B through a local line, 24, and switch 40, which is grounded so that the armature *t* is drawn away from the stop *m* and put to ground through the stop 34, the main battery M B at this instrument B being thus thrown out of action.

The printing-instruments are illustrated at F and H. These printing telegraph-instruments are of any character that may be adapted to the circuit-connections hereinafter described; but I prefer the kind in which the type-wheels and unison are actuated by clock-work and controlled by electro-magnets and reverse currents. Each instrument may have two type-wheels with suitable mechanism for taking impressions from one or the other. This class of instruments is usually termed the "stock-quotation" ticker, and is too well known to require any additional explanation.

I have represented an escapement-wheel at 16 and the escapement and armature at 17. Said armature 17 is preferably polarized and is pulsated between the poles of the type-wheel magnets T M; and upon the shaft 18, that carries the escapement-wheel 16 and the type-wheel, is an arm and trailer, 19, that travels over a circle of segments known as the "sunflower," corresponding in number to the characters on the type-wheels, and from each of the sunflower-segments a wire connects with a key upon the ordinary key-board, K, and the contact-bar of the key-board is grounded at G.

The press-magnet is indicated at P M, and the lever that carries the printing-pad and armature is indicated at P. Upon this lever P is a spring, 22, which in its normal position rests against the stop 23, and this stop 23 is connected by a local line, 24, running from the place where the printing-instrument is located to the central station containing the synchronous instrument A or B, and there it is connected to the helices of the transmitting-relay T R, and thence to the battery T B and to ground. There is a call-bell at L, preferably what is known as the "magneto bell," which consists of magnets and an unbiased polarized armature, and the circuit for the same passes from the switch-contact 28 through the helices of L and a resistance R *h* to the ground.

Presuming that the parts are in the positions indicated in Fig. 1, which represents F as sending to H, the current from the main battery M B at station A passes through back-stop *m*, armature *t*, wire 35, through reversing-relay R R, wire 12, segment 5, trailer 2, arm D, over the main line to the arm D at station B, its trailer 2, segment 5, wire 12, reversing-relay R R, wire 35, armature *t*, lower stop, 34, to ground, thereby charging the relays R R, causing the armatures 14 to be thrown against their stops 30, and when the trailers on the arms D reach the segments 4 the current from M B passing through *m t* 35, reversing-relay R R, and wire 11, and the polarity of the relays R R will be reversed, causing the tongues or armatures 14 to be thrown in the opposite direction; hence as the trailers on the arms D come in contact alternately with the segments 4 and 5, the direction through the relays R R and their polarity will be reversed, and their armatures 14 will vibrate between the stops 30 and 31. As the armatures 14 are vibrating in unison at the two stations A and B, currents pass from the reversing-batteries R B over the armatures 14, and the local lines 25 through T M and P M to the ground, the reversing-batteries R B also being grounded at G. In consequence of these pulsating and reverse currents passing over the local lines 25, the type-wheels of the two printing-instruments F and H will revolve in unison, but the press-magnets P M will not be actuated, because they are so constructed and the armature so adjusted as to be sluggish, as is usual in printing-instruments of this order. If, now, the operator at F depresses one of his keys, a circuit is closed from the ground through the key K, its wire and segment 20, and through the trailer 19 when it arrives at that segment, and by the wire 33, spring 22, stop 23, wire 24, helices of transmitter-relay T R, and battery T B to the ground. The armature *t* is drawn on its lower stop, 34, thereby taking the main battery off the main line and connecting the segments at station A to the ground. The pulsation through the relays R R ceasing, their armatures 14 remain against one of their stops 30 or 31. The type-wheels stand still and the prolongation of contact of armatures 14, with the batteries R B, sufficiently charges the press-magnets P M to actuate their armatures P, to take the desired impressions from the type-wheels. At the station B, the magnet T R does not change its action, because it remains energized by the switch 40 remaining on the grounded contact *p*, but at the instrument F the circuit from T B, through local line 24, is broken by the downward movement of the press P at the stop 23; hence the armature *t* instantly flies up against its stop *m*, thereby again connecting the main battery to the main line, and the pulsations in the reversing-relays R R are re-established simultaneously, so that the press-magnets P M release their armatures and the type-wheels are again set in motion and so continue; and if a key at F is depressed, or several keys are depressed, the operation before described will take place successively as the trailer 19 closes contact with the segments of the sunflower in succession. At the receiving-printer H the movements of the type-wheels are controlled entirely by the transmitter of the instrument F, because the switch 40 of instrument H is turned aside so as to ground the line 24 and hold the armature *t* at the station B out of contact with *m*; hence by the current pulsated over the main line from station A and the currents pulsated by the relays R R, through the magnets T M and P M of the printing-instrument, the movements of the instrument H are controlled in perfect harmony with those of the instrument F.

I wish here to remark that, supposing the trailers 2 were passing over one of their segments 4 or 5, and at that moment the main battery M B was connected with them, as would be the case where the armature $t$ reaches its top stop, $m$, the probabilities are that the relay R R at the distant station would not receive a sufficient charge of current to actuate its armature 14, in which case the type-wheel at that station would pause and a letter or character might be printed. This risk is prevented in consequence of the contacts 22 23 acting automatically, so that the main battery M B is connected with the segments during the time the trailer 2 is traveling between one segment and the next, and never when it is actually on a segment, thus effectually preventing the two printing-instruments losing their synchronous action from this cause, and also facilitating the rapid printing of the characters by not being compelled to release a key before being able to print another character by depressing another key. These printing-instruments are provided with unison stops. (Not shown in the drawings.) They may be of any desired character. I prefer a unison in each that is brought into action by about three revolutions of the type-wheel, and stops the further rotation until the unison-key is depressed and the movements of the printing-levers at the two instruments simultaneously disconnect the unison-stops and allow the type-wheels to start off together, and the unisons are not brought into action unless the type-wheels are allowed to revolve several times without printing any characters. Unisons of this character are well known, and one such is illustrated in my Patent No. 358,379, at U, Fig. 1.

The receiving operator at the distant station can at any time break the sending operator by turning his switch 40 off the grounded button $p$ onto the button $p'$. This opens the circuit of T B at B and allows the armature $t$ to fly up and rest against the top stop, $m$, which throws the main battery of the distant station B onto the main line, so that if like poles of M B are to line their currents will oppose and neutralize each other and the reversing-relays R R cease to be actuated; but should the poles of M B be of opposite polarity, as indicated in the drawings, the currents from each will join up and the type-wheels of both printing-instruments will run to unison and no letters can be printed, whether the operator at F is depressing his keys or not, because the reversing-relays R R will be actuated by the current from M B of station B, and there will be no pause in the pulsations, whether the armature $t$ at station A be on its top stop, $m$, or on its lower stop, 34. When the printing-instruments are not in action, the switches 40 should be in contact with the ground-contacts $p$, so that the main batteries will both be off the line, and the switches 26 are to be turned on the contacts 28, so that the circuits of battery R B will be through the helices of the signals L, and the resistance R $h$ to ground. The object of this resistance is to prevent the said batteries R B being rapidly consumed or polarized when the instruments are not in action. A magneto-bell, as herein described, may be actuated through a very high resistance by a comparatively small battery.

When one subscriber desires to communicate with his correspondent, and it is presumed that the printing-instruments are out of action, and that the switch 40 of each printer is on its contact $p$, and the switches 26 on their contacts 28, the operator, for instance at F, turns the switch 40 from off its contact $p$ onto $p'$. This breaks the circuit of the battery T B and allows the armature $t$ to put the main battery on the main line, over which it is pulsated by the synchronously-revolving trailers and energizes both reversing-relays R R, causing their armatures 14 to vibrate and thereby pulsating the currents of R B over the local lines 25, through the bells or signals L, to ring the same, after which the switch 40 at F is restored to contact $p$ and the ringing ceases. At the receiving-station H, the operator to answer the signal simply repeats the operation by turning his switch 40 from off contact $p$ onto $p'$, thereby causing both bells to be actuated and notifying the first operator to proceed with his message, after which the switch 40 at H is restored to contact $p$, and both operators turn their switches 26 on contacts $p^2$. The operator at F then starts both printing-instruments simultaneously by moving his switch 40 from $p$ to $p'$, because in so doing he breaks the ground-connection at $p$ of the battery T B, and the armature $t$ puts the main battery M B upon the main line to be pulsated and to move both printing-instruments, as before described.

Fig. 2 represents the manner of operating what is technically known as a "pole-changer," and which may be utilized with advantage in the system before described. The pole-changer P C is actuated by the local battery L B, through either the helices V or the helices W and the armature 14 of the relay R R and its stops 30 31. The positive and negative poles of the battery R B are alternately put on the local line 25 and to ground, according to the position of the armature S and its yielding contacts $v$ $w$, in the manner well known with this character of circuit-controller, the advantage of this arrangement being that but one reversing-battery is required. Consequently the current that is reversed to operate the printing-instrument acts with the same strength in T M to move the armatures 17 in either direction, thus unifying the action of the printer.

Where it is desired to prolong the action of the reversing-relay, to hold the armature more firmly against the stop 30 or 31 each pulsation, a condenser may be placed in a shunt between the branch wires 11 and 12, as at 50, and a condenser, 51, may be used, as shown in Fig. 2, in a shunt around the printer in place of the resistance R $h^2$, Fig. 1. The shunt shown by dotted lines as passing around the helices T M P M, contains a resistance, R $h^2$, which is sufficient to cause the principal part of the current to pass through T M P M; but it prevents the development of sparks between the armature 14 and contact 30 or 31 by providing a metallic circuit for the discharge of the electro-magnets.

I claim as my invention—

1. The combination, with synchronously-revolving trailers and the circles of segments, of branch circuit-connections from alternate segments, reversing-relays, main batteries, and transmitting-relay for placing either main battery on the line to be pulsated by the trailers through the two reversing relays, substantially as set forth.

2. The combination, with the synchronously-revolving trailers and the circles of segments, of branch circuit connections from alternate segments, reversing-relays, main batteries, transmitting-relays, printing telegraph-instruments, and local line-circuits from the same to the transmitting-relays and to the armatures of the reversing-relays and local reversing-batteries in the circuits, substantially as set forth.

3. The combination, with a printing telegraph-instrument, of a sunflower of contacts and key-board, a trailer on the type-wheel shaft, local line-circuits, a reversing relay and battery, a transmitting-relay and battery, a main battery, a synchronously-revolving trailer, and branch circuit-connections through the reversing-relay, and an armature on the transmitting-relay to put the main battery to the line or to take the same off, substantially as set forth.

4. The combination, with the press-magnet and lever, in a printing telegraph-instrument, of a sunflower of contacts and key-board, a trailer on the type-wheel shaft, a contact-spring, 22, upon the press-lever, and a transmitting relay and battery, the circuit of which includes the spring 22, and is broken by the movement of the press-lever, substantially as set forth.

5. The combination, with synchronously-moving trailers, circles of segments, batteries, and relays, substantially as set forth, of two telegraph-instruments and local circuits for the same to the relays of the synchronous instruments, and the switches 40 in the ground local circuits of the transmitting-relays, whereby the operator at the receiving-station is able to signal or "break" the operator at the transmitting-station, substantially as set forth.

6. The combination, with the reversing-battery R B and the local circuit thereof, of the pole-changing arms $v$ $w$ and contacts, and the electro-magnets V W and armature S, and a local battery and armature for directing the current from the local battery through either the magnet V or W, substantially as set forth.

7. The combination, with the printing telegraph-instrument, of a reversing-relay, reversing-battery, and the armature for directing the currents through the printing-instrument, a call and a resistance in a branch circuit, and a switch for the same, whereby the call can be operated from the distant station, substantially as specified.

8. The combination, with the circle of segments, of a reversing-relay and the branch circuit-connections to the alternate groups of said segments, and a condenser to shunt the reversing-relay, substantially as set forth.

Signed by me this 22d day of January, A. D. 1887.

R. G. BROWN.

Witnesses:
GEO. T. PINCKNEY,
WILLIAM G. MOTT.